US010071881B2

(12) United States Patent
Zhao

(10) Patent No.: US 10,071,881 B2
(45) Date of Patent: Sep. 11, 2018

(54) SAFETY SYSTEM FOR USE IN A DRIVE SYSTEM

(71) Applicant: Otis Elevator Company, Farmington, CT (US)

(72) Inventor: Peng Zhao, Farmington, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 15/103,688

(22) PCT Filed: Dec. 12, 2013

(86) PCT No.: PCT/CN2013/089171
§ 371 (c)(1),
(2) Date: Jun. 10, 2016

(87) PCT Pub. No.: WO2015/085527
PCT Pub. Date: Jun. 18, 2015

(65) Prior Publication Data

US 2016/0318735 A1 Nov. 3, 2016

(51) Int. Cl.
*B66B 1/32* (2006.01)
*H02K 7/10* (2006.01)
(Continued)

(52) U.S. Cl.
CPC .......... *B66B 5/0031* (2013.01); *B66B 5/0018* (2013.01); *B66B 5/02* (2013.01);
(Continued)

(58) Field of Classification Search
USPC .......................................................... 187/247
See application file for complete search history.

(56) References Cited

U.S. PATENT DOCUMENTS 4,567,560 A * 1/1986 Polis .................. G06F 11/0751 187/248
5,526,256 A 6/1996 Sakata et al.
(Continued)

FOREIGN PATENT DOCUMENTS

CN 102092608 A 6/2011
CN 102452595 A 5/2012
(Continued)

OTHER PUBLICATIONS

Office action for CN201380081521.8 dated May 2, 2017.
EP search report for EP13899016.3 dated Aug. 22, 2017.
Office action for CN201380081521.8 dated Oct. 10, 2017.

*Primary Examiner* — Christopher Uhlir
(74) *Attorney, Agent, or Firm* — O'Shea Getz P.C.

(57) ABSTRACT

A safety system for use in a drive system includes first and second safety sensors that provide respective first and second sensor signals indicative of a safety condition of the drive system. The safety system includes a safety device that processes the first and second sensor signals to determine a safety state of the drive system, and that controls a unit of the drive system based on the safety state. The safety device includes a multi-core processor having first and second processing cores. In some embodiments, the first and second processing cores receive and process the respective first and second sensor signals in parallel to determine the safety state. In other embodiments, each of the first and second processing cores receive both the first and second sensor signals, and each of the first and second processing cores process both the first and second sensor signals to determine the safety state.

18 Claims, 1 Drawing Sheet

(51) Int. Cl.
*B66B 5/00* (2006.01)
*B66B 5/02* (2006.01)
*B66B 5/16* (2006.01)
*B66B 25/00* (2006.01)
*B66B 29/00* (2006.01)

(52) U.S. Cl.
CPC .............. *B66B 5/16* (2013.01); *B66B 25/006* (2013.01); *B66B 29/00* (2013.01); *B66B 29/005* (2013.01)

(56) References Cited

U.S. PATENT DOCUMENTS

| | | | |
|---|---|---|---|
| 6,173,814 B1 | 1/2001 | Herkel et al. | |
| 6,230,871 B1 * | 5/2001 | Balzer-Apke | B66B 25/00 198/323 |
| 6,267,219 B1 | 7/2001 | Spannhake et al. | |
| 6,273,234 B1 | 8/2001 | Balzer-Apke et al. | |
| 6,580,991 B2 * | 6/2003 | Disser | B60T 8/885 180/6.44 |
| 6,666,319 B2 * | 12/2003 | Balzer-Apke | B66B 29/005 198/322 |
| 6,758,319 B1 | 7/2004 | Lange et al. | |
| 6,766,893 B2 | 7/2004 | Neumann et al. | |
| 6,827,196 B2 | 12/2004 | Wiesinger et al. | |
| 6,966,419 B2 | 11/2005 | Tada | |
| 6,971,496 B1 | 12/2005 | Nurnberg et al. | |
| 7,407,048 B2 | 8/2008 | Boom | |
| 7,533,763 B2 * | 5/2009 | Kattainen | B66B 1/28 187/287 |
| 7,574,271 B2 | 8/2009 | Steindl et al. | |
| 7,950,514 B1 | 5/2011 | Nurnberg et al. | |
| 2003/0000798 A1 | 1/2003 | Williams et al. | |
| 2003/0168311 A1 | 9/2003 | Balzer-Apke et al. | |
| 2011/0011700 A1 | 1/2011 | Plathin et al. | |
| 2014/0027210 A1 * | 1/2014 | Rogers | B66B 5/0018 187/393 |

FOREIGN PATENT DOCUMENTS

| | | | |
|---|---|---|---|
| EP | 2246285 | A1 | 11/2010 |
| WO | WO2004076326 | A1 | 9/2004 |
| WO | WO2006090470 | A1 | 8/2006 |
| WO | WO2006106575 | A1 | 10/2006 |

* cited by examiner

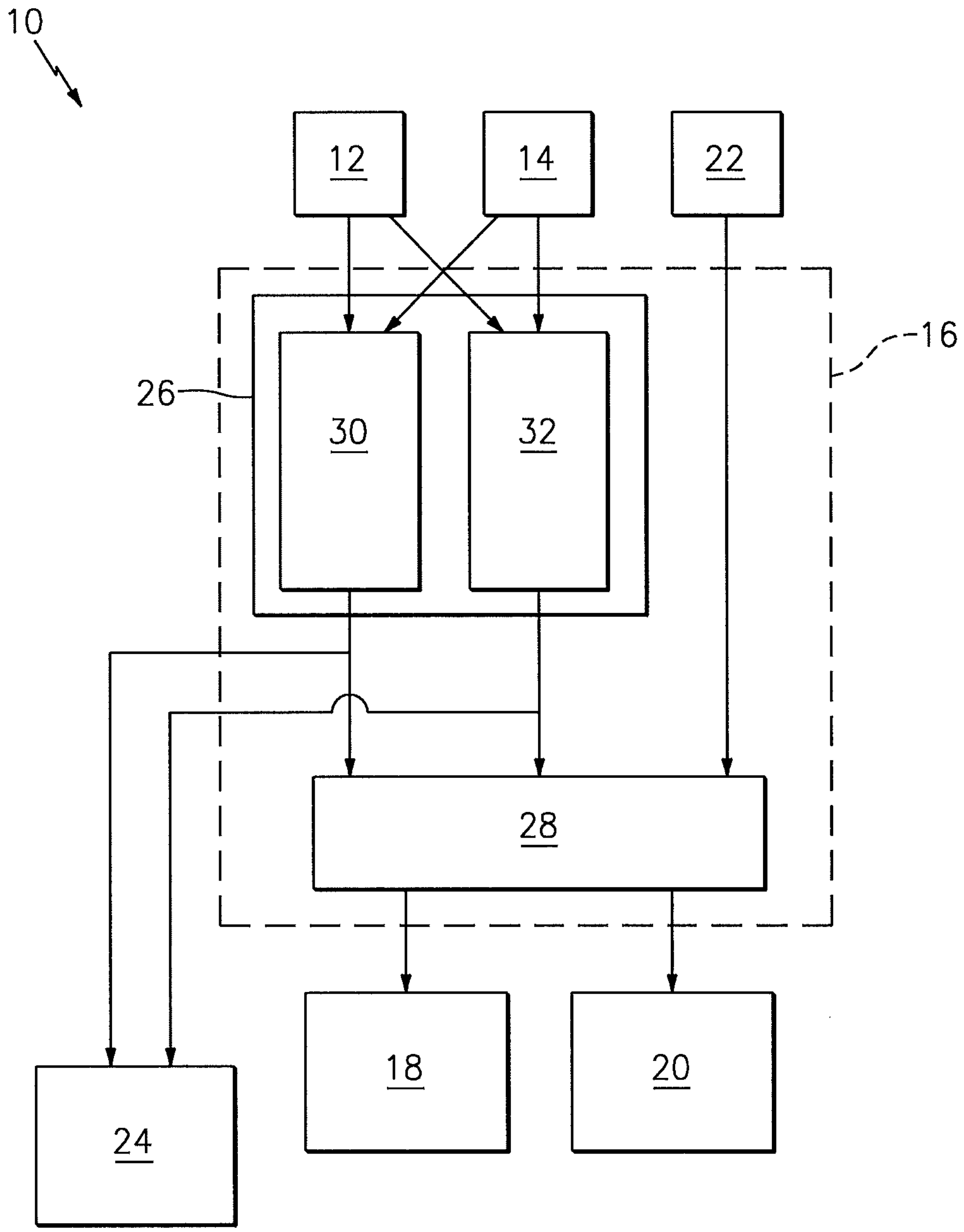
10
12
14
22
16
26
30
32
28
18
20
24

SAFETY SYSTEM FOR USE IN A DRIVE SYSTEM

This application claims priority to PCT Patent Application No. PCT/CN2013/089171 filed Dec. 12, 2013, which is hereby incorporated herein by reference in its entirety.

BACKGROUND

1. Technical Field

Aspects of the present invention relate to a safety system for use in a drive system, and more particularly relate to a safety system for use in a passenger conveyance system such as an escalator system or a moving sidewalk system.

2. Background Information

It is known to provide a safety system for use in a drive system. There is a need for improved safety systems that operate at a high safety integrity level, and that are relatively inexpensive and relatively easy to implement. Aspects of the present invention are directed to an improved safety system for use in a drive system.

SUMMARY OF ASPECTS OF THE INVENTION

According to an aspect of the present invention, a safety system configured for use in a drive system includes a first safety sensor, a second safety sensor, and a safety device. The first safety sensor is operable to provide a first sensor signal indicative of a safety condition of the drive system, and the second safety sensor is operable to provide a second sensor signal indicative of the safety condition. The safety device is operable to process the first and second sensor signals to determine a safety state of the drive system. The safety device is operable to control a unit of the drive system based on the safety state. The safety device includes a multi-core processor that includes a first processing core and a second processing core. The first processing core is operable to receive the first sensor signal from the first safety sensor, and the second processing core is operable to receive the second sensor signal from the second safety sensor. The first and second processing cores are operable to process the respective first and second sensor signals to determine the safety state of the drive system.

According to another aspect of the present invention, a safety system configured for use in a drive system includes safety sensors that are operable to detect a safety condition of the drive system and that are operable to provide sensor signals indicative thereof to a safety processing unit. The safety processing unit includes a multi-core processor operable to process the sensor signals to determine a safety state of the drive system. The multi-core processor is operable to provide safety signals to a safety control unit. The safety signals are indicative of a safety state of the drive system. The safety control unit is operable to control at least one of a drive unit and a brake unit based on the safety signals.

Additionally or alternatively, the present invention may include one or more of the following features individually or in combination:

- the drive system is a passenger conveyance system, such as an escalator system or a moving sidewalk system;
- the safety state of the drive system is at least one of a safe state and an unsafe state;
- the unit is one or more of the following: (1) a drive unit operable to rotationally drive a component of the drive system; (2) a first brake unit operable to brake a component of the drive system; (3) a second brake unit operable to brake a component of the drive system; (4) a primary brake unit; and (5) an emergency brake unit;
- the safety condition is indicative of a presence of a component of the drive system;
- the safety condition is indicative of an absence of a component of the drive system;
- the first processing core is disposed on a first integrated circuit die, the second processing core is disposed on a second integrated circuit die, and the first and second integrated circuit die are the same;
- at least one of the first and second processing cores has a dual-channel configuration;
- at least one of the first and second processing cores has a single-channel with diagnose configuration;
- the first and second processing cores are operable to process the respective first and second sensor signals in parallel to determine the safety state of the drive system;
- each of the first and second processing cores are operable to receive both the first and second sensor signals, and each of the first and second processing cores are operable to process both the first and second sensor signals to determine the safety state of the drive system;
- a safety chain operable to provide a safety chain signal indicative of the safety state of the drive system, wherein the safety device is operable to receive the safety chain signal, the safety device being operable to control the unit of the safety system based on the safety chain signal;
- the safety device further includes a safety control unit, the safety control unit being operable to receive signals from the first and second processing cores, and the safety control unit being operable to control the unit of the safety system based on the signals received from the first and second processing cores;
- a safety chain operable to provide a safety chain signal indicative of the safety state of the drive system, wherein the safety control unit is operable to receive the safety chain signal, the safety control unit being operable to control the unit of the safety system based on the safety chain signal; and
- the safety control unit is operable to detect an inconsistency between the signals received from the first and second processing cores, the safety control unit being operable to interpret the inconsistency to mean that the safety state of the drive system is an unsafe state.

These and other aspects of the present invention will become apparent in light of the drawings and detailed description provided below.

BRIEF DESCRIPTION OF THE DRAWING

FIG. 1 illustrates a block diagram of a safety system.

DETAILED DESCRIPTION OF ASPECTS OF THE PRESENT INVENTION

Referring to FIG. 1, the present disclosure describes embodiments of safety system 10 configured for use in a drive system. The present disclosure describes aspects of the present invention with reference to the embodiment illustrated in FIG. 1; however, aspects of the present invention are not limited to the embodiment illustrated in FIG. 1.

The safety system 10 can be configured for use in various types of drive systems. For example, the drive system can be a moving sidewalk system, an escalator system, an elevator system, or another type of passenger conveyance system. FIG. 1 illustrates a safety system 10 configured for use in an escalator system.

The safety system 10 includes a plurality of safety sensors 12, 14, a safety device 16, a drive unit 18, and a first brake unit 20. The safety device 16 is operable to receive signals from the safety sensors 12, 14, the signals being indicative of a safety condition of the drive system (e.g., the speed of a component of the drive system, etc.). The safety device 16 is operable to process the signals received from the safety sensors 12, 14 to determine a safety state (e.g., a safe state, an unsafe state, etc.) of the drive system. The safety device 16 is operable to control one or both of the drive unit 18 and the first brake unit 20 based on the safety state of the drive system. In some embodiments, the safety system 10 additionally includes one or both of a safety chain 22 and a second brake unit 24. In embodiments that include a safety chain 22, the safety device 16 is operable to receive a signal from the safety chain 22, the signal being indicative of a safety state (e.g., a safe state, an unsafe state, etc.) of the drive system. In such embodiments, the safety device 16 is operable to control one or both of the drive unit 18 and the first brake unit 20 based on the signal received from the safety chain 22. In embodiments that include a second brake unit 24, the safety device 16 is operable to control the second brake unit 24 based on the safety state of the drive system.

Each of the safety sensors 12, 14 is operable to provide a signal indicative of a safety condition of the drive system. In some embodiments, for example, each of the safety sensors 12, 14 is operable to provide a signal indicative of the speed of a component (e.g., an escalator step, etc.) included in the drive system. In other embodiments, each of the safety sensors 12, 14 is operable to provide a signal indicative of the presence (or absence) of a component (e.g., an escalator step, etc.) of the drive system. The number of safety sensors 12, 14 included in the safety system 10 can vary; however, the safety system 10 includes at least two safety sensors 12, 14 that are operable to provide a signal indicative of the same safety condition of the drive system. In the embodiment illustrated in FIG. 1, for example, the safety system 10 includes first and second safety sensors 12, 14, each of which is operable to provide a signal indicative of the speed of an escalator step (not shown) included in the drive system. The at least two safety sensors 12, 14 that are operable to provide a signal indicative of the same safety condition of the drive system can be described as being "redundant" relative to one another.

The safety device 16 includes a safety processing unit 26 and a safety control unit 28.

The safety processing unit 26 includes a multi-core processor that includes at least a first processing core 30 and a second processing core 32. The phrase "multi-core processor" and variations thereof are used herein to indicate that the first and second processing cores 30, 32 are disposed on the same integrated circuit die. The first processing core 30 is operable to receive signals from one or both of the at least two redundant safety sensors 12, 14, and the second processing core 32 is operable to receive signals from one or both of the at least two redundant safety sensors 12, 14. In the embodiment illustrated in FIG. 1, for example, each of the first and second processing cores 30, 32 is operable to receive signals from each of the first and second safety sensors 12, 14. The first and second processing cores 30, 32 are operable to process the signals received from the at least two redundant safety sensors 12, 14 to individually determine a safety state of the drive system, and each of the first and second processing cores 30, 32 is operable to provide a signal to the safety control unit 28 indicative thereof. In some embodiments not shown in the drawings, the first and second processing cores 30, 32 are operable to receive signals from the at least two redundant safety sensors 12, 14 via a common bus interface. In other embodiments, including the embodiment illustrated in FIG. 1, the at least two redundant safety sensors 12, 14 are directly connected to each of the first and second processing cores 30, 32. In embodiments that include a second brake unit 24, each of the first and second processing cores 30, 32 can control the second brake unit 24 by providing a signal indicative of a safety state of the drive system. The first and second processing cores 30, 32 can have various configurations. For example, each of the first and second processing cores 30, 32 can have a dual-channel configuration, or a single-channel with diagnose configuration.

The inclusion of the multi-core processor in the safety processing unit 26 can be advantageous for various reasons. For example, the first and second processing cores 30, 32 of the multi-core processor can process the signals received from the at least two redundant safety sensors 12, 14 in parallel, and thus can enable the safety system 10 to operate at a higher safety integrity level than would be possible if the respective signals were instead processed by the same single-core processor. Also, the multi-core processor can be cheaper and easier to implement than other designs that include multiple single-core processors. The phrase "single-core processor" is used herein to mean a processor that includes only one processing core disposed on an integrated circuit die.

The functionality of the safety processing unit 26 can be implemented using hardware (e.g., programmable processors, non-transitory computer readable storage mediums, etc.), software, firmware, or a combination thereof. In some embodiments, the safety processing unit 26 can perform one or more of the functions described herein by executing software, which can be stored, for example, in a ROM unit included in the safety processing unit 26. A person having ordinary skill in the art would be able to adapt (e.g., program, etc.) the safety processing unit 26 to perform the functionality described herein without undue experimentation.

The safety control unit 28 is operable to receive signals from the safety processing unit 26, the signals being indicative of a safety state (e.g., a safe state, an unsafe state, etc.) of the drive system. The safety control unit 28 is operable to control one or both of the drive unit 18 and the first brake unit 20 based on the signals received from the safety processing unit 26. In embodiments that include a safety chain 22, the safety control unit 28 is operable to receive a signal from the safety chain 22, the signals being indicative of a safety state of the drive system. In such embodiments, the safety control unit 28 is operable to control one or both of the drive unit 18 and the first brake unit 20 based on the signal received from the safety chain 22.

The safety control unit 28 can function in various different ways. In some embodiments, for example, the signals received by the safety control unit 28 can indicate that the drive system is being operated in an unsafe state when a safety condition has not been satisfied, and in response the safety control unit 28 can stop the operation of the drive unit 18 by electrically disconnecting its power source, and can electrically initiate an actuator that moves the first brake unit 20 from a non-braking position to a braking position. In some embodiments, the safety control unit 28 is operable to detect an inconsistency between the signals provided by the safety processing unit 26. In such embodiments, for example, the safety control unit 28 is operable to detect an inconsistency between the respective signals provided by the first and second processing cores 30, 32 of the multi-core processor included in the safety processing unit 26. In such embodiments, the safety control unit 28 can interpret such an inconsistency to mean that the drive system is being operated in an unsafe state.

The functionality of the safety control unit 28 can be implemented using hardware (e.g., programmable processors, relays, switches, non-transitory computer readable storage mediums, etc.), software, firmware, or a combination thereof. In some embodiments, the safety control unit 28 can perform one or more of the functions described herein by executing software, which can be stored, for example, in a ROM unit included in the safety control unit 28. A person having ordinary skill in the art would be able to adapt (e.g., program, etc.) the safety control unit 28 to perform the functionality described herein without undue experimentation. Although the safety control unit 28 is described herein as being separate from the safety processing unit 26, in some embodiments the safety control unit 28, or one or more features thereof, can be implemented as a feature of the safety processing unit 26.

The drive unit 18 is operable to drive (e.g., rotationally drive, etc.) a component (e.g., a conveyor band, an escalator step, etc.) of the drive system. The first brake unit 20 is operable to brake a component (e.g., a conveyor band, an escalator step, etc.) of the drive system. In embodiments in which the safety system 10 includes a second brake unit 24, the second brake unit 24 also is operable to brake a component (e.g., a conveyor band, an escalator step, etc.) of the drive system. In such embodiments, the first brake unit 20 can be a primary brake unit, and the second brake unit 24 can be an emergency brake unit or an auxiliary brake unit.

In embodiments in which the safety system 10 additionally includes a safety chain 22, the structure and functionality of the safety chain 22 can vary, and in some embodiments can be the same as or similar to the structure and functionality of other safety chains that are known in the art.

The safety system 10 can operate in various different ways. In some embodiments, for example, during operation of the drive system, the safety sensors 12, 14 periodically detect a safety condition of the drive system and periodically provide signals indicative thereof to the safety processing unit 26 of the safety device 16; the multi-core processor included in the safety processing unit 26 processes the signals received from the safety sensors 12, 14 to determine a safety state of the drive system; the multi-core processor periodically provides signals to the safety control unit 28 indicative of the safety state of the drive system; and the safety control unit 28 controls one or both of the drive unit 18 and the first brake unit 20 based on the signal received from the safety processing unit 26.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A safety system configured for use in a drive system, the safety system comprising:

a first safety sensor operable to provide a first sensor signal indicative of a safety condition of the drive system;

a second safety sensor operable to provide a second sensor signal indicative of the safety condition;

a safety device operable to process the first and second sensor signals to determine a safety state of the drive system, wherein the safety device is operable to control a unit of the drive system based on the safety state of the drive system;

wherein the safety device includes a multi-core processor that includes a first processing core and a second processing core, the first processing core is operable to receive directly from the first safety sensor the first sensor signal and to receive directly from the second safety sensor the second sensor signal, the second processing core is operable to receive the second sensor signal from the second safety sensor, and the first processing core is operable to process the first sensor signal and the second sensor signal and the second processing core is operable to process the second sensor signal to determine the safety state of the drive system;

wherein the safety device includes a safety control unit, the safety control unit being operable to receive signals from the first and second processing cores, and the safety control unit being operable to control the unit of the safety system based on the signals received from the first and second processing cores;

wherein the unit includes a drive unit and a first brake unit, and wherein the safety system further comprises a second brake unit, and wherein each of the first and second processing cores is operable to control the second brake unit by providing a signal indicative of a safety state of the drive system directly to the second brake unit.

2. The safety system of claim 1, wherein the drive system is a passenger conveyance system.

3. The safety system of claim 2, wherein the drive system is an escalator system or a moving sidewalk system.

4. The safety system of claim 1, wherein the safety state of the drive system is at least one of a safe state and an unsafe state.

5. The safety system of claim 1, wherein the unit is a drive unit operable to rotationally drive a component of the drive system.

6. The safety system of claim 1, wherein the first brake unit is operable to brake a component of the drive system.

7. The safety system of claim 1, wherein the second brake unit is operable to brake a component of the drive system.

8. The safety system of claim 1, wherein the first brake unit is a primary brake unit and the second brake unit is an emergency brake unit.

9. The safety system of claim 1, wherein the safety condition is indicative of a presence of a component of the drive system.

10. The safety system of claim 1, wherein the safety condition is indicative of an absence of a component of the drive system.

11. The safety system of claim 1, wherein the first processing core and the second processing core are disposed on a same integrated circuit die.

12. The safety system of claim 1, wherein at least one of the first and second processing cores has a dual-channel configuration.

13. The safety system of claim 1, wherein at least one of the first and second processing cores has a single-channel with diagnose configuration.

14. The safety system of claim 1, wherein the first and second processing cores are operable to process their respective received signals in parallel to determine the safety state of the drive system.

15. The safety system of claim 1, wherein the second processing core is operable to receive from the first safety sensor the first sensor signal, and the second processing core is operable to process the first and second sensor signals to determine the safety state of the drive system.

16. The safety system of claim 1, further comprising a safety chain operable to provide a safety chain signal indicative of the safety state of the drive system;

wherein the safety device is operable to receive the safety chain signal, the safety device being operable to control the unit of the safety system based on the safety chain signal.

17. The safety system of claim 1, further comprising a safety chain operable to provide a safety chain signal indicative of the safety state of the drive system;

wherein the safety control unit is operable to receive the safety chain signal, the safety control unit being operable to control the unit of the safety system based on the safety chain signal.

18. The safety system of claim 1, wherein the safety control unit is operable to detect an inconsistency between the signals received from the first and second processing cores, the safety control unit being operable to interpret the inconsistency to mean that the safety state of the drive system is an unsafe state.

* * * * *